(12) United States Patent
Chapman (10) Patent No.: US 9,507,244 B2
(45) Date of Patent: Nov. 29, 2016

(54) LIGHTWEIGHT TELESCOPING CAMERA CRANE

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 14/683,931

(22) Filed: Apr. 10, 2015

(65) Prior Publication Data

US 2016/0299411 A1    Oct. 13, 2016

(51) Int. Cl.
*G03B 17/00* (2006.01)
*G03B 17/56* (2006.01)

(52) U.S. Cl.
CPC .................................. *G03B 17/561* (2013.01)

(58) Field of Classification Search
CPC ...... G03B 17/00; G03B 17/56; F16M 11/00; F16M 13/04
USPC ....................................... 396/428; 248/123.2
See application file for complete search history.

(56) References Cited

U.S. PATENT DOCUMENTS

| | | |
|---|---|---|
| 6,776,488 B2 | 8/2004 | Burbulla |
| 7,128,479 B2 | 10/2006 | Chapman |
| 7,252,441 B2 | 8/2007 | Chapman |
| 7,854,555 B2 | 12/2010 | Chapman |
| 8,033,742 B1 | 10/2011 | Chapman |
| 8,328,439 B2 | 12/2012 | Chapman et al. |
| 8,403,486 B2 | 3/2013 | Chapman |
| 2005/0191050 A1* | 9/2005 | Chapman ............... B60R 11/04 396/428 |

FOREIGN PATENT DOCUMENTS

| | | |
|---|---|---|
| EP | 2397436 A1 | 12/2011 |
| WO | 2007013828 A1 | 2/2007 |

OTHER PUBLICATIONS

European Patent Office, "The Extended European Search Report" issued in EP Application No. 16164027.1 (Aug. 23, 2016).

* cited by examiner

*Primary Examiner* — Clayton E Laballe
*Assistant Examiner* — Fang-Chi Chang
(74) *Attorney, Agent, or Firm* — Kenneth H. Ohriner; Perkins Coie LLP (57) ABSTRACT

A lightweight camera crane has an outer arm pivotally attached to a base. A trim weight tray is rigidly attached to a back end of the outer arm. A moving counterweight carriage is supported on carriage rollers on top of the outer arm. An inner arm is supported on arm rollers within the outer arm. A camera platform is pivotally attached to a front end of the inner arm for tilt axis movement. An electric leveling motor connected to the camera platform via a mechanical linkage keeps the camera platform level regardless of the tilt angle of the camera crane. An electric extension motor drives telescoping extension and retraction movement of the inner arm via chains, belts or cables connected to the counterweight carriage and the inner arm.

15 Claims, 10 Drawing Sheets

LIGHTWEIGHT TELESCOPING CAMERA CRANE

BACKGROUND OF THE INVENTION

The field of the invention is camera cranes. Camera cranes are often used in motion picture and television production. The motion picture or television camera is typically mounted on the front end of a crane arm with counterweights at the back end of the crane arm. The crane arm is pivotally supported on a base to allow the crane arm to tilt up and down and pan from side-to-side. The base is typically supported on a camera dolly, wheeled mobile base, or truck.

Telescoping camera cranes have a telescoping arm that can extend and retract, providing far more capability than fixed length crane arms. However, existing telescoping camera cranes generally weigh several hundred kilograms, which exceeds the safe load carrying capacity of small portable camera dollies. Consequently, for filming in confined or less accessible spaces where only a small portable camera dolly can be used, there are few if any options for using a telescoping camera crane.

Of course, existing telescoping camera cranes can be made smaller which also makes them lighter. However, regardless of the size, the camera crane must be able to consistently hold the camera (and various associated payloads such as a remote camera head) in a steady position, even with the arm fully extended. As the camera crane size is reduced, the smaller structural components of the camera crane have reduced capability to resist unintended or undesirable camera movements, due to bending, flexing, twisting, or vibration. Accordingly, engineering challenges remain in designing a lightweight and compact telescoping camera crane.

SUMMARY OF THE INVENTION

In one aspect, a lightweight camera crane has an outer arm pivotally attached to a base. A trim weight tray is rigidly attached to a back end of the outer arm. A moving counterweight carriage is supported on carriage rollers on top of the outer arm. An inner arm is supported on arm rollers within the outer arm. A camera platform is pivotally attached to a front end of the inner arm for tilt axis movement. An electric leveling motor connected to the camera platform via a mechanical linkage keeps the camera platform level regardless of the tilt angle of the camera crane. An electric extension motor drives telescoping extension and retraction movement of the inner arm via chains, belts or cables connected to the counterweight carriage and the inner arm.

The camera crane weighs is lightweight and may be supported on a small camera dolly or pedestal. For example, a camera crane having an inner arm with 2 meters of travel weighs about 170 kg. As a result, both the camera dolly and the camera crane may be lifted and carried by a camera crew for use in locations otherwise not accessible to heavier camera cranes.

Other aspects and features are shown in the drawings, which show one example of how the lightweight camera crane may be designed, and which are not intended to specify a limit on the scope of the invention.

DETAILED DESCRIPTION OF THE DRAWINGS

Figure 1:
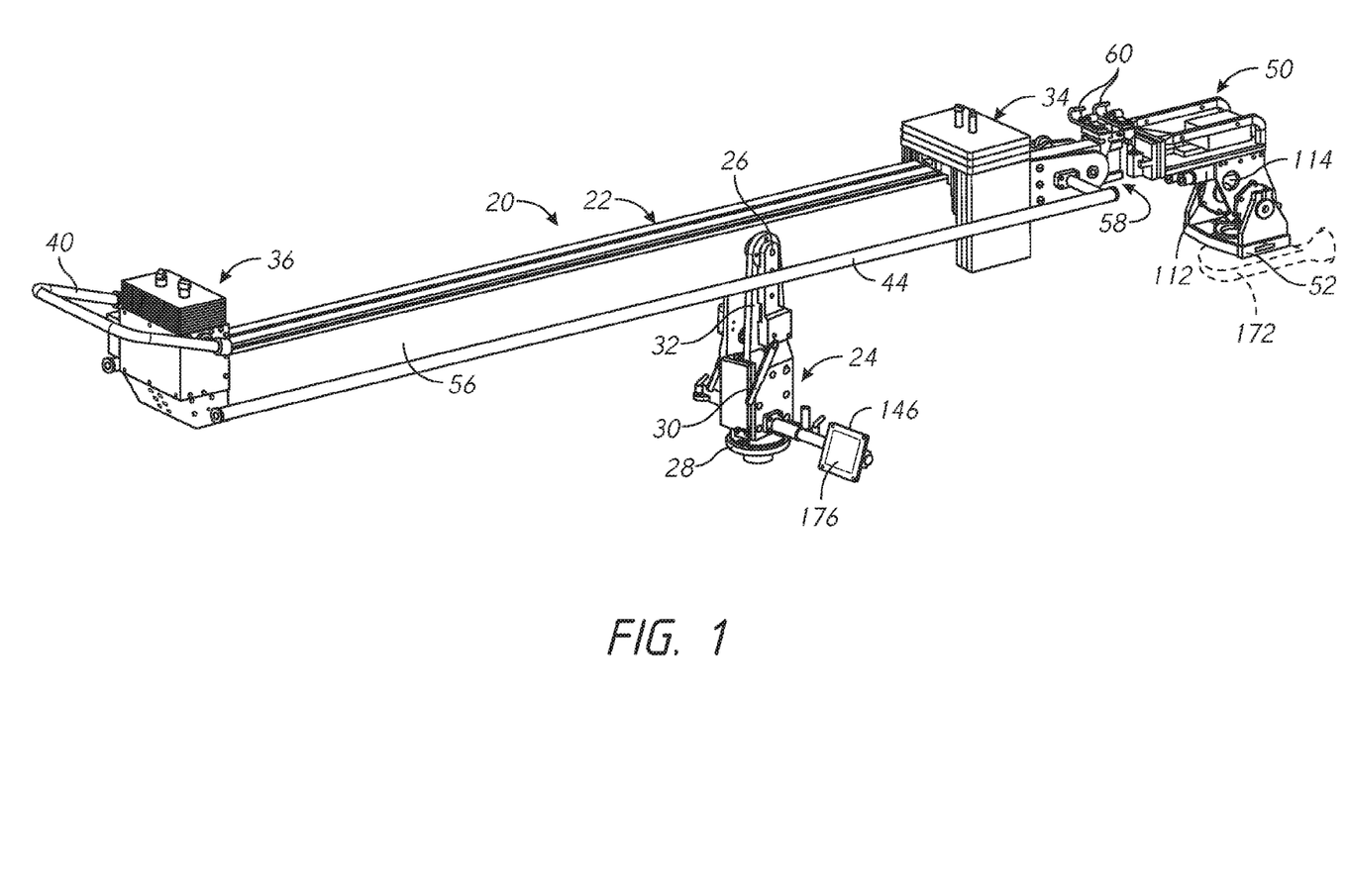
FIG. 1 is a top, rear and right side perspective view of a lightweight telescoping camera crane.
Figure 2:
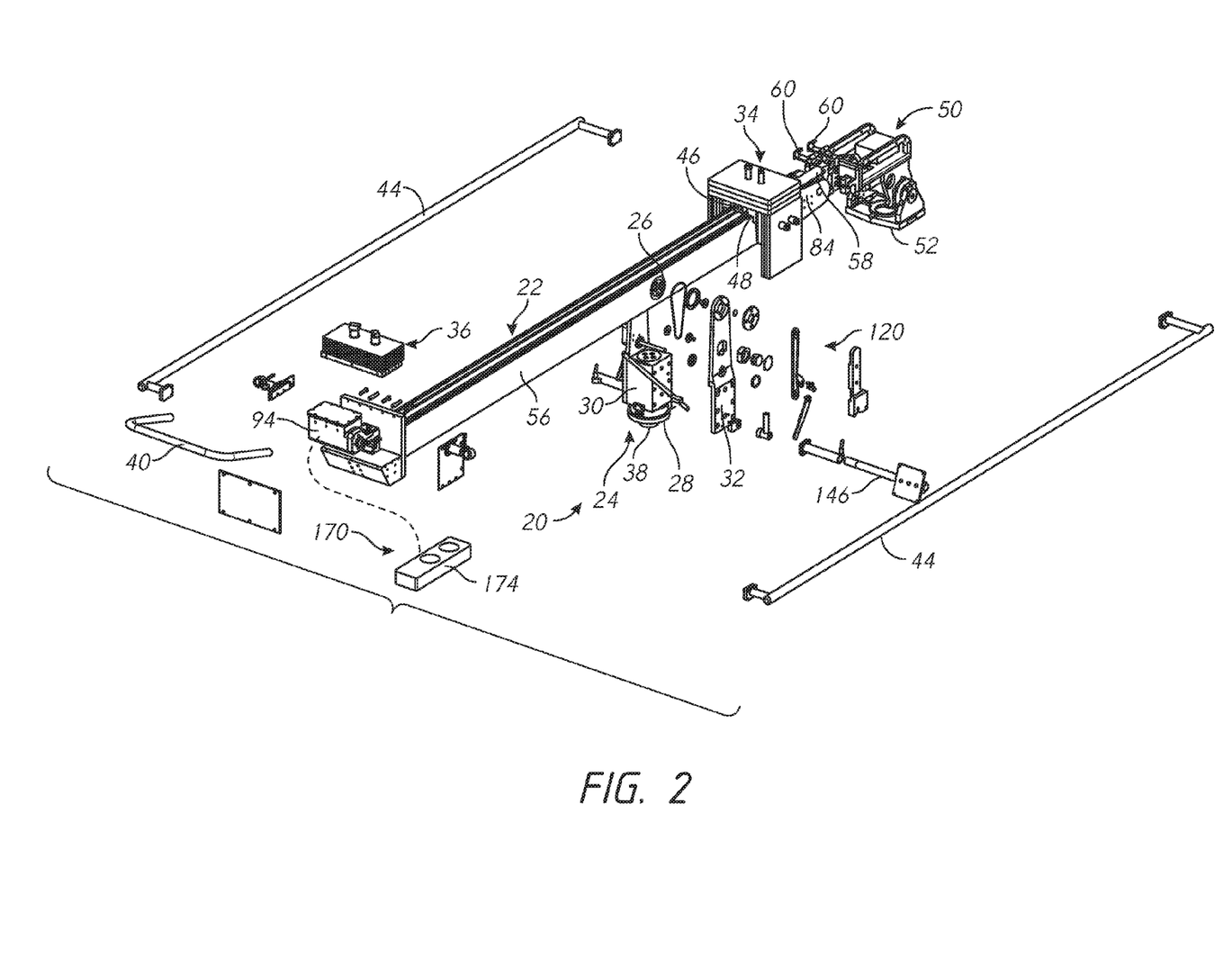
FIG. 2 is an exploded perspective view of the camera crane as it is shown in FIG. 1.
Figure 3:
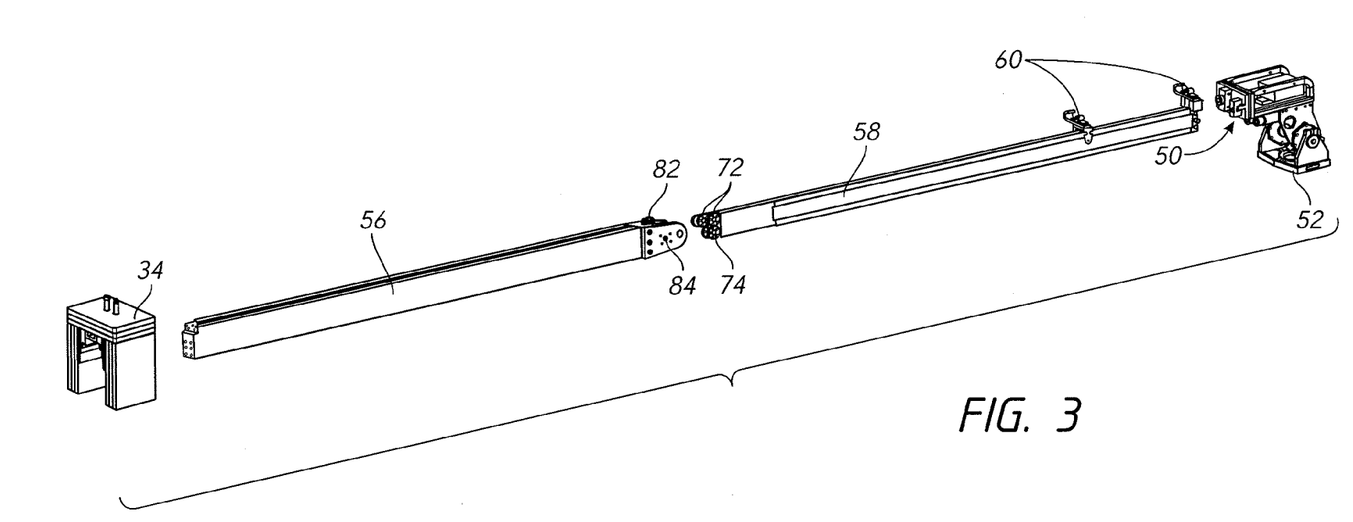
FIG. 3 is a similar exploded perspective view of major elements of the camera crane shown in FIGS. 1 and 2, with components removed for purpose of illustration.
Figure 4:
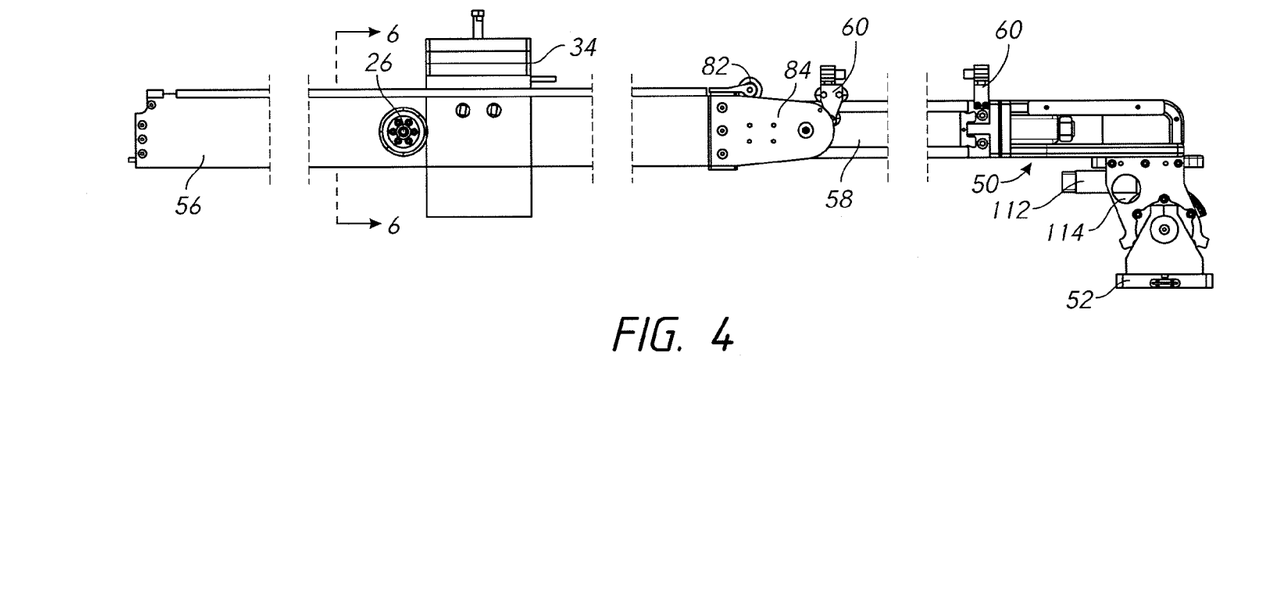
FIG. 4 is a side view of the camera crane of FIGS. 1 and 2 with the base and trim weight platform removed.

As shown in FIGS. 1 and 2, a camera crane 20 has a crane arm 22 including an outer arm 56 and an inner arm 58 telescopically extendible into and out of the outer arm 56. The outer arm 56 is pivotally mounted on a base 24 via axles 26. Handles are attached to the outer arm 56, such as a rear handle 40 and side handles 44, to allow the crane arm 22 to be easily grasped, moved, or held into a desired position. A nose frame 50 is rigidly attached, e.g., bolted, onto the front end of the inner arm. The camera (not shown) is attached to the mounting plate 52. The nose frame 50 may be magnesium, to reduce weight. Referring now also to FIGS. 3 and 4, one or more tilt motors 112 acting through a tilt gear drive or linkage 114 pivot the mounting plate 52 as required to keep the mounting plate (and the camera on the mounting plate) level, regardless of the tilt angle of the crane arm 22, as described in Chapman U.S. Pat. No. 7,854,555, incorporated herein by reference.

Figure 13:
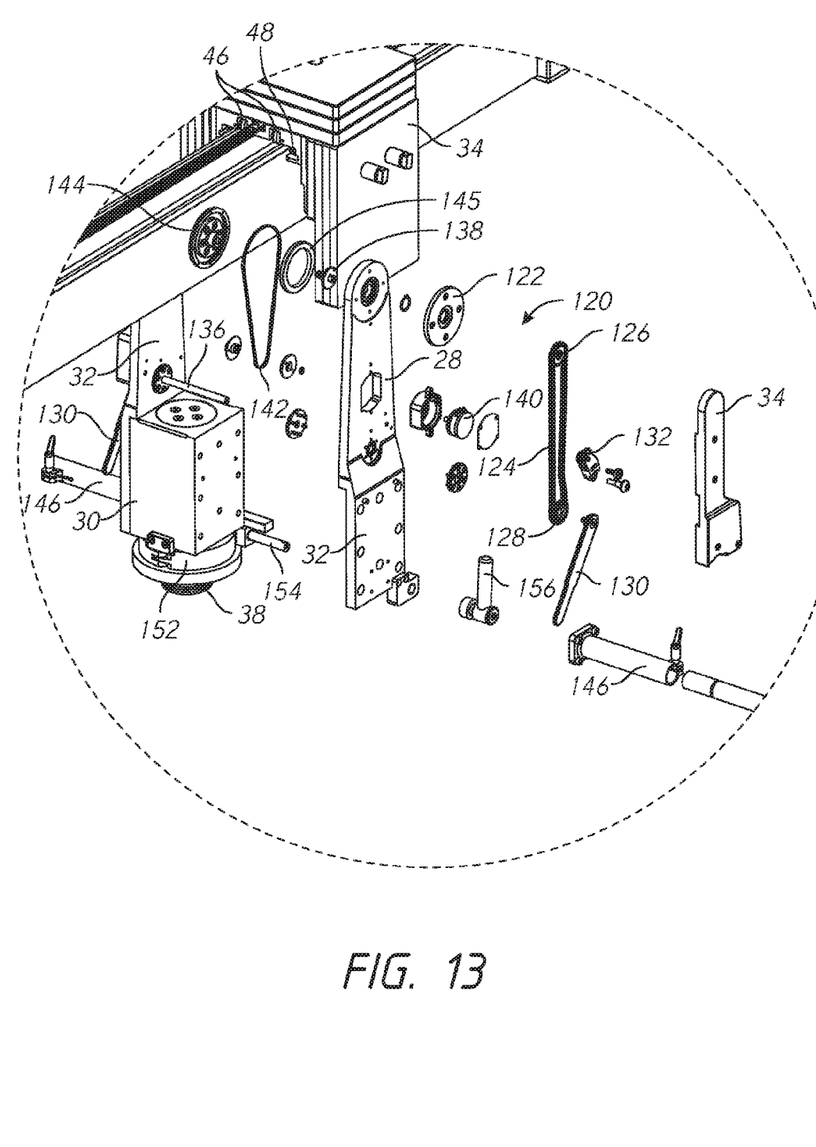
FIG. 13 is a top, rear and right side exploded perspective view of the base shown in FIGS. 1 and 2.

A counterweight carriage 34 rolls on a top surface of the outer arm 56 to keep the crane arm 22 balanced as the inner arm 58 extends and retracts. Specifically, as shown in FIGS. 2 and 13, the counterweight carriage 34 has top rollers 46 which roll on a top surface of the outer arm 56, and side rollers 48 which roll on the sides of the outer arm 56. The counterweight carriage 34 typically carries a fixed number of counterweight plates selected so that the crane arm is balanced regardless of the position of the inner arm, with a minimum payload or no payload on the mounting plate 52.

The weights on the counterweight carriage may be changed as needed if the nose frame 50 is replaced with a heavier or lighter nose assembly.

As shown in FIGS. 1 and 2, a trim weight tray 36 is attached to the back end of the outer arm 56. Trim weight plates are added to or removed from the trim weight tray to balance the crane arm 22 after the payload is attached to the nose frame 50 and the crane 20 is ready for use. Sliding or rolling trim weights may be provided on the side handles for making small balance adjustments.

Figure 8:
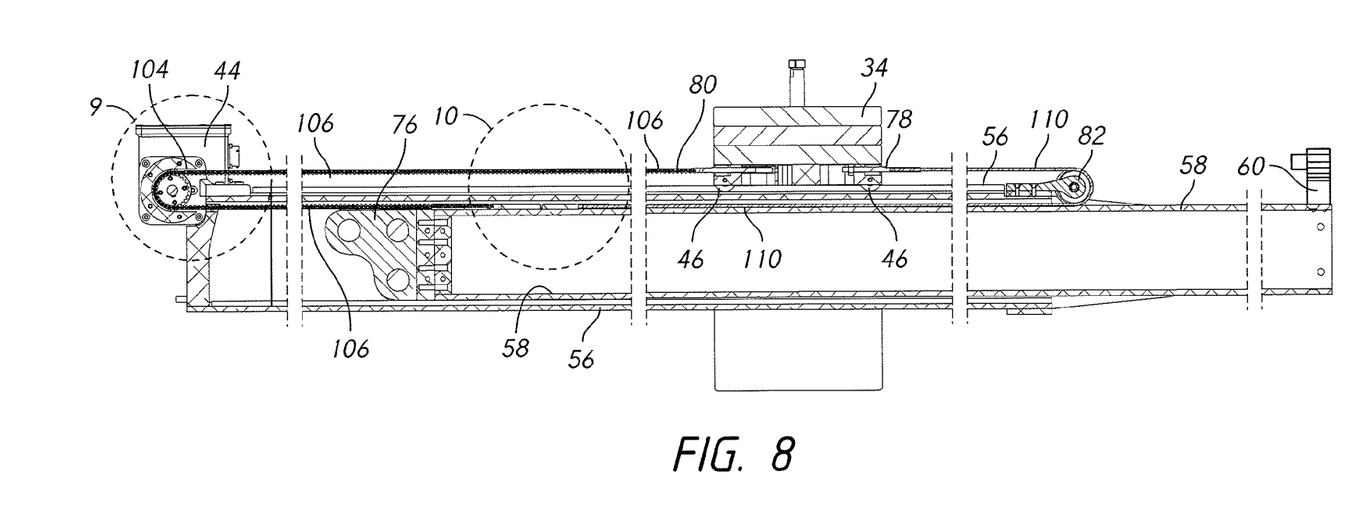
FIG. 8 is a side view in part section of the crane as shown in FIG. 7.
Figure 9:
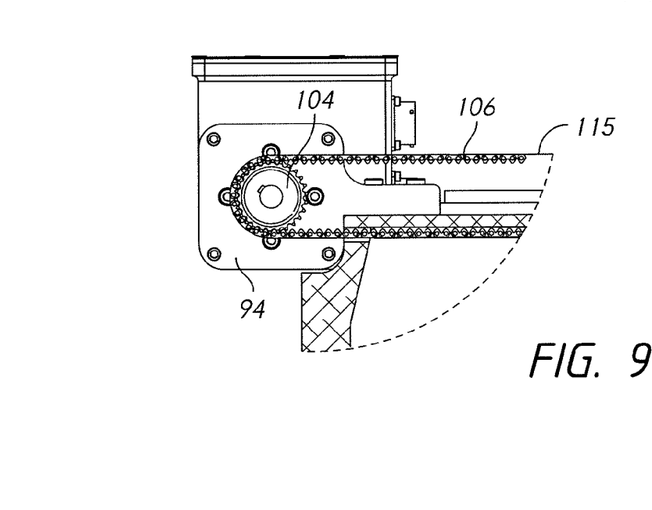
FIG. 9 is an enlarged detail section view of the back end of the crane as shown in FIG. 8.
Figure 10:
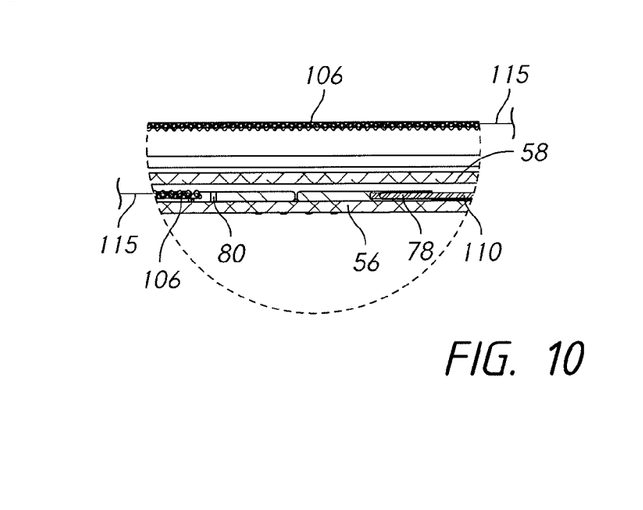
FIG. 10 is an enlarged detail section view of a portion of the counterweight carriage as shown in FIG. 8, with covers removed in FIGS. 7-10 for purpose of illustration.

Referring now to FIGS. 7-10, an extension motor 102 drives a sprocket 104 through a gear drive 96 within a motor enclosure 94 at the back end of the outer arm 56. The gear reduction may have a drive ratio of 2-6, to allow for manually moving the inner arm by back driving the motor. A first end of a chain 106 is attached to the back end of the counterweight carriage 34 via a first chain anchor 80. The chain 106 wraps around the sprocket 104 with the other end of the chain 106 attached to the back end of the inner arm 58 via a second chain anchor 80, as shown in FIG. 10.

Figure 7:
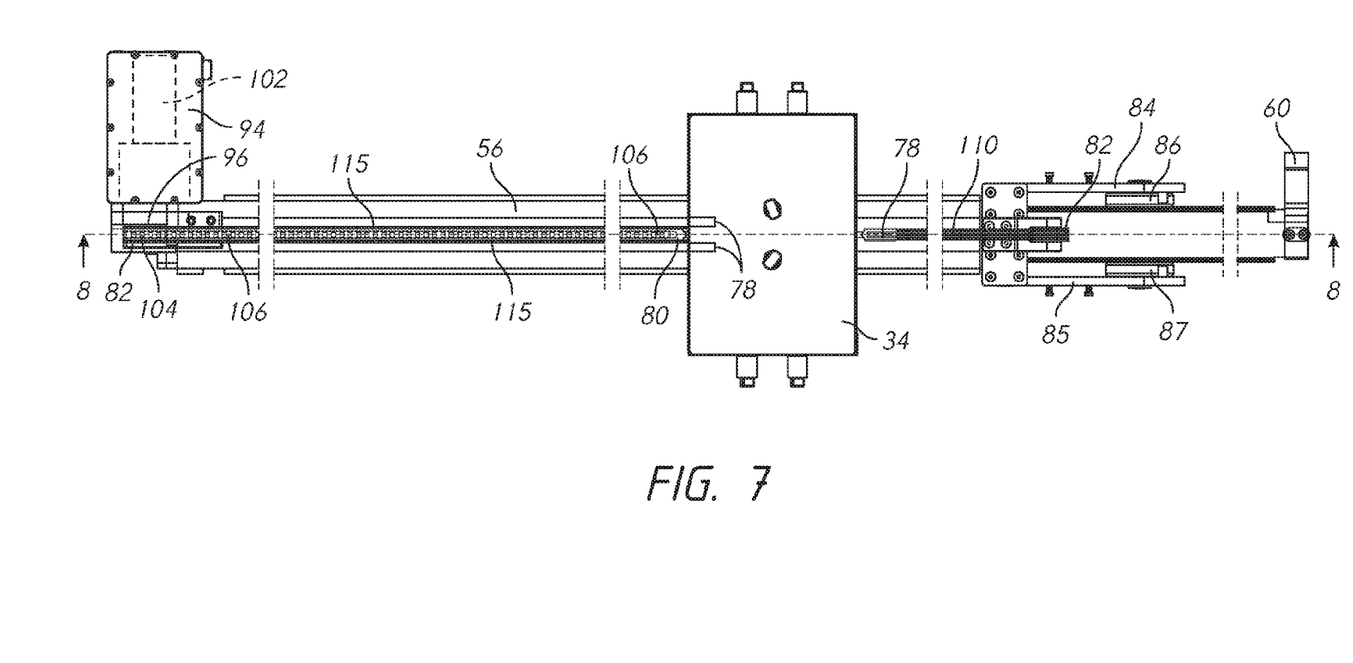
FIG. 7 is a top view of the crane of FIGS. 1-2, showing the crane with the inner arm in a partially extended position.
Figure 17:
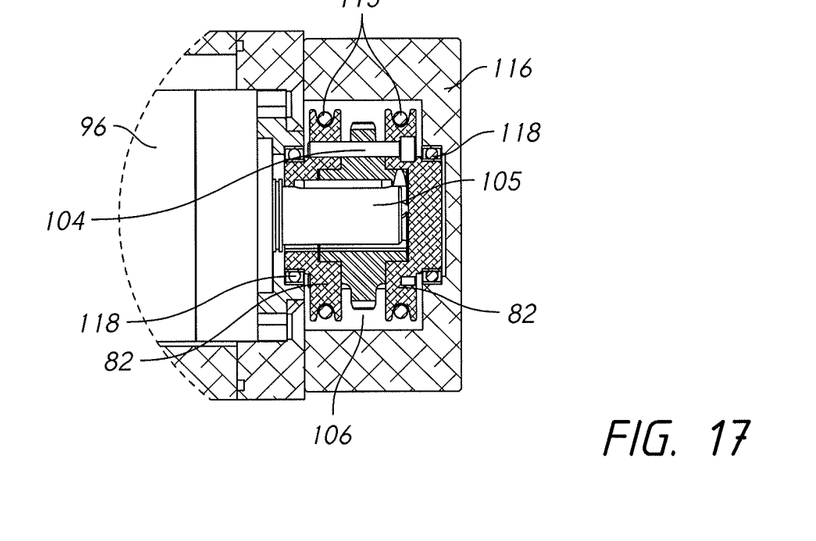
FIG. 17 is an enlarged section view detail of the sprocket and pulleys shown in FIG. 16.

As shown in FIGS. 7, 9 and 17, two rear cables 115 run alongside of the chain 106, with one end of each cable attached to the back end of the counterweight carriage 34 via a cable anchor 78, and with the other end of each cable attached to near the back end of the inner arm. The chain and cable anchors allow tension to be adjusted.

A first end of each of a group of three front cables 110 is attached to a front end of the counterweight carriage 34 via a first cable anchor 78, with the cables running over pulleys 82 on the front end of the outer arm 56, and with second end of each front cable 110 attached to the inner arm 58 via a second cable anchor 78 adjacent to, and in front of, the first chain anchor 80. The chain 106 may be replaced by a belt and the front cables 110 may be replaced by a chain or belt. The extension motor 102 is powered via an electrical cable connected to batteries or other power supply typically carried on the camera dolly. The extension motor 102 may be controlled via a wireless controller carried by the crane operator, or via a hand control attached or tethered to the crane 22.

Figures 11, 12:
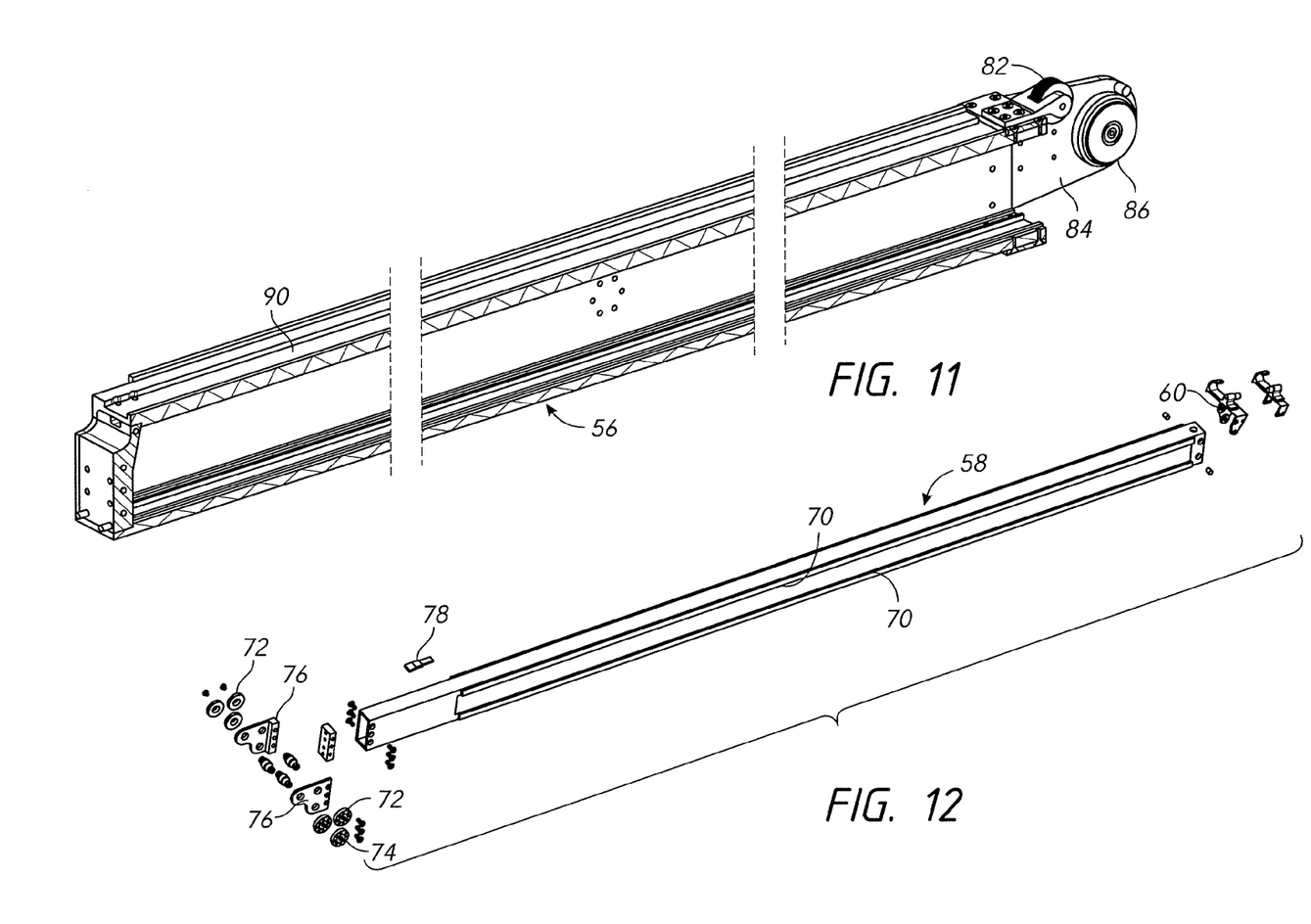
FIG. 11 is a top, right and rear perspective view, in part section, of the outer arm shown in FIGS. 1 and 2.
FIG. 12 is an exploded top, rear and right side perspective view of the inner arm shown in FIGS. 1 and 2.

As shown in FIGS. 11 and 12, upper roller tracks 70 and lower roller tracks 71 are attached to the sides of the inner arm 58. Left front rollers 86 and right front rollers 87 are rotatably attached to left and right front plates 84 and 85, respectively, bolted onto the front end of the outer arm 56. The left and right front rollers 86 and 87 fit between the upper roller tracks 70 and the lower roller tracks 71. Upper inner rear rollers 72 and lower inner rear rollers 74 are rotatably attached to roller brackets 76 on opposite sides of the back end of the inner arm 58. The rollers may be Torlon® polyamide-imide polymer, providing quiet and wear resistant operation. A second pair of left and right front rollers 86 may optionally be provided at the front end of the outer arm 56, providing a total of four front rollers 86.

With the inner arm retracted, the weight of the inner arm, and the weight of the nose assembly and the camera, is supported on the lower roller tracks 71. As the inner arm 58 extends, the load on the inner arm 58 is shifted onto the upper roller tracks 70 supported by the front rollers 86, with the upper inner rear rollers 72 at the back end of the inner arm rolling on the inside top surface of the outer arm 56. Cable supports 60 are captive around and roll on the upper roller tracks 70 to provide intermediate cable support locations for cables running to the camera on the mounting plate 52.

Figure 5A:
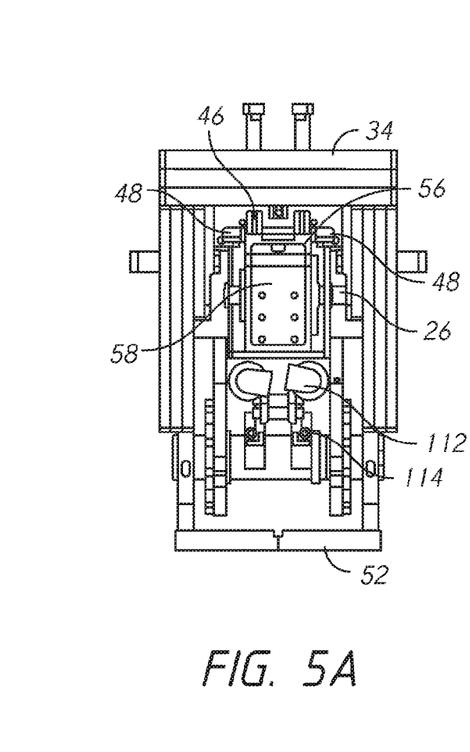
FIG. 5A is a rear view of the camera crane of FIG. 4.
Figure 5B:
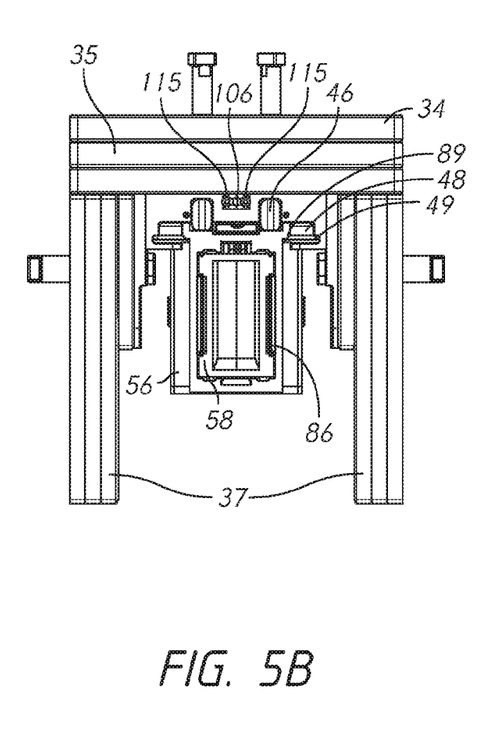
FIG. 5B is a view similar to FIG. 5A but with the nose assembly removed, for purpose of illustration.
Figure 6:
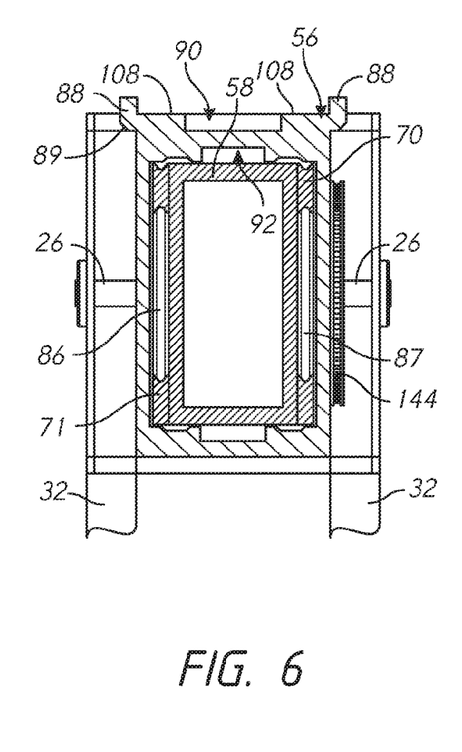
FIG. 6 is a section view taken along line 6-6 of FIG. 4, with the counterweight carriage removed.

Referring still to FIGS. 6, 11 and 12, the outer arm 56 may be an aluminum extrusion formed as a hollow rectangle with a top channel 90 in the top wall between left and right top flanges 88 and an internal channel 92 under the top channel 90. As shown in FIG. 5, the top rollers 46 roll on the left and right shoulders 108 of the outer arm 56, between the left and right top flanges 88, with the side rollers 48 rolling on the sides of the flanges 88. As shown in FIG. 5B, the flanges 88 have an angle section 89. The side rollers 48 may have a flange 49 which fits under the angle section 89 to prevent the counterweight carriage 34 from lifting up off of the top surface of the outer arm 56. Referring to FIGS. 8-10, the chain 106 and the front cables 110 and rear cables 115 are positioned within the internal channel 92, providing a more compact design.

Figure 14:
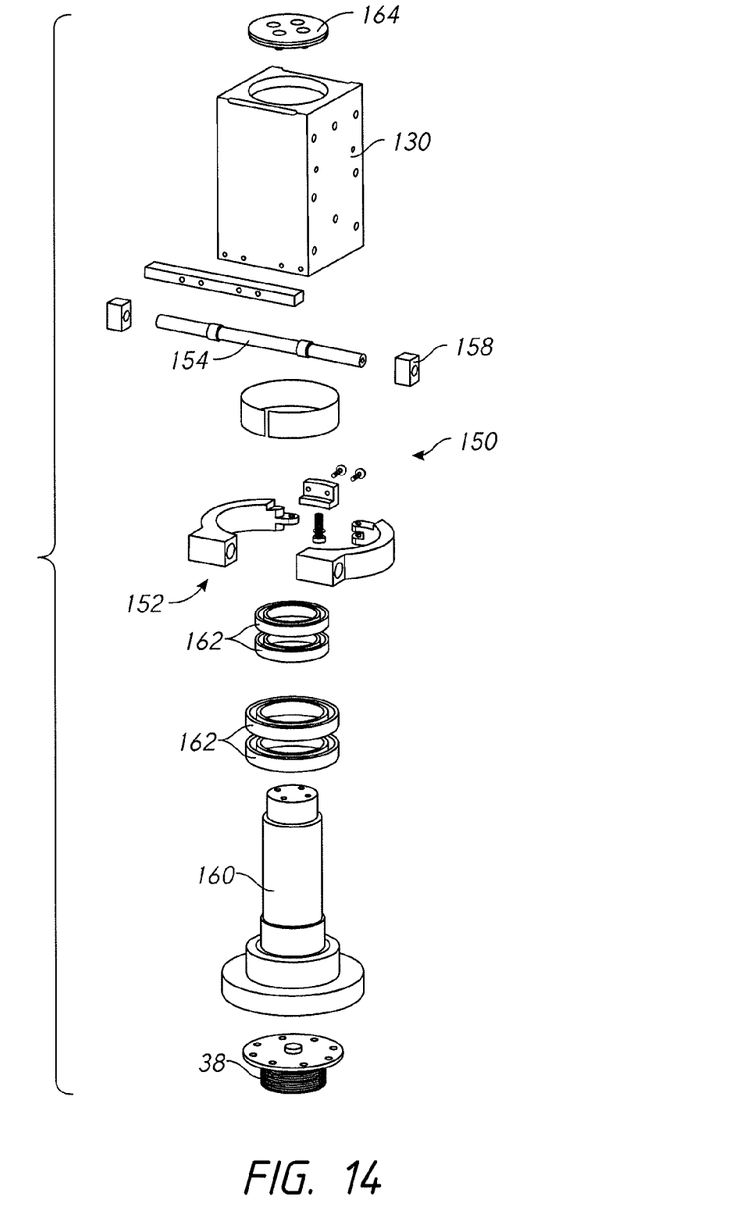
FIG. 14 is a top and front exploded perspective view of the base frame shown in FIG. 13.

Turning to FIGS. 1, 2 and 13, a threaded fitting 38, such as a Mitchel™ mount fitting, is provided at the bottom of the base 24 for attaching the base 24 onto the arm of a camera dolly. As shown in FIG. 14, a base frame 30 is rotatably supported on a center post 160 via pan bearings 162, with the pan bearings 162 held in place via a frame cap 164 bolted onto the upper end of the center post 160.

In FIG. 13, the left and right base plates 28 and 32 are bolted onto the sides of the base frame 30. The axles 26 on the outer arm 56 extend into bearings at the upper ends of the base plates, so that the crane arm 22 is pivotally attached to the base 24 and can tilt up and down. An encoder chain 142 extends around a crane arm sprocket 144 fixed to the right side of the outer arm 56 around the axle 26, and around an encoder sprocket on a rotary encoder 140 on the right base plate 32. The rotary encoder 140 senses the tilt angle of the crane arm 22 and provides a tilt angle signal to a controller which controls the tilt motors 112 to keep the mounting plate 52 level as the crane arm 22 tilts up and down.

A tilt brake assembly 120 includes a brake sprocket 126 and a lever sprocket 128 both rotatably mounted on the right base plate 32 and connected via a brake chain 124. An idler 132 maintains tension on the brake chain 124. A brake lever is rigidly attached to the lever sprocket 128. The brake sprocket 126 is mounted on a lead screw thread on a tension shaft 138 on the right base plate 32. A brake plate 122 is positioned between the brake sprocket 126 and the outside of the right base plate 32. A brake ring 145 is positioned between the inside of the base plate and the outer arm. The brake ring 145 may be Delrin acetal resin. The brake sprocket 126 and the lever sprocket 128 and the brake chain 124 are covered via a chain cover 134. Although FIG. 13 largely shows the right side of the tilt brake assembly 120, the same components as described above are provided on the right base plate 32.

A tilt brake lever axle 136 connects the lever sprockets on the left and right sides. Pulling either the left or right brake lever 130 rotates the lever sprocket 128, which rotates the brake sprocket 126, causing the brake sprocket 126 to move inwardly on the tension shaft, compressing the brake ring 145 between the outer arm and the top end of the right base plate 32. This movement exerts braking force on both sides of the outer arm 56, without acting on the axle bearings. The tilt brake assembly may be used to slow tilt movement of the crane arm 22, or to lock the crane arm at a fixed tilt angle. As shown in FIG. 13, the tilt brake assembly 120 has a minimum width to allow the side weights on the counterweight carriage 34 to pass over the tilt brake assembly without interference.

In FIG. 13, a monitor support 146 is bolted onto the right base plate 32 for supporting a monitor providing an image from the camera to the camera operator and/or the crane operator. The monitor consequently pans with the crane arm 22, allowing the operators to more easily view the image from the camera continuously. With the monitor in constant view from the side of the crane arm 22, and with controls for the camera and for the extension motor at or near the back of the crane arm 22, or on a hand held unit, the camera and the crane 20 may be entirely controlled by a single operator. A second monitor support may be provided on the left base plate 28. The monitor support may extend telescopically outward to allow the monitor to be positioned further to one side of the crane, as may be desired.

Referring to FIGS. 13 and 14, a pan brake assembly 150 has a split collar 152 around the center post 160, which is rigidly attached to the base frame 30. A pan brake rod 154 extends through the split collar 152 and is threaded into followers 158 having left and right hand screw threads. A pan brake lever 156 is attached to one or both sides of the pan brake rod 154. Turning the pan brake lever 156 drives the followers 158 towards each other, causing the split collar 152 to clamp onto the center post 160, braking panning movement of the crane arm 22. The pan brake assembly 150 may be used to slow panning movement of the crane arm 22 about the base 24 or to lock the crane arm 22 against any panning movement.

Figure 15:
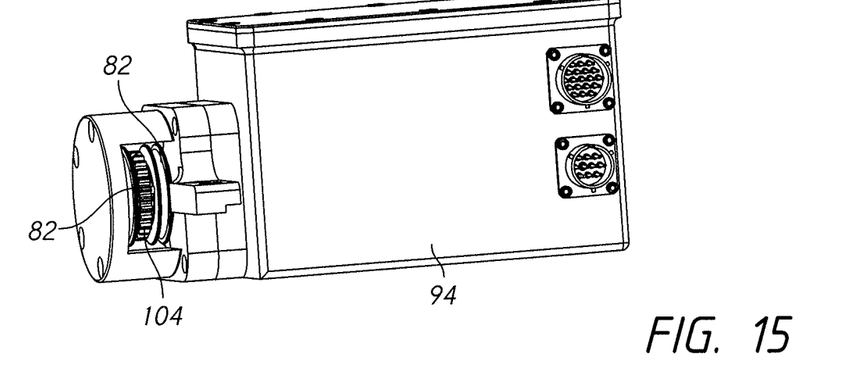
FIG. 15 is a front, top and right side perspective view of the motor housing shown in FIGS. 2 and 9.
Figure 16:
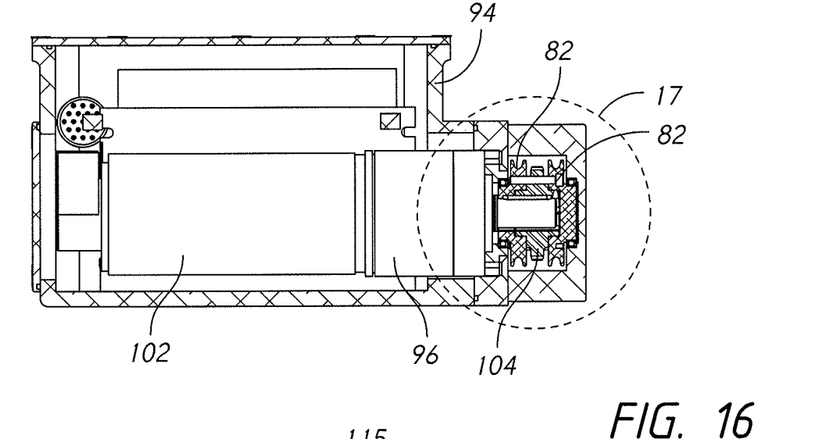
FIG. 16 is a section view of the motor housing shown in FIG. 15.

Turning to FIGS. 15, 16 and 17, the sprocket 104 is attached to the output shaft 105 of the gear drive 96. The gear drive 96 may have a gear ratio which is low enough to allow back driving the extension motor 102. This allows the inner arm to be manually extended or retracted, e.g., by pushing or pulling on the counterweight carriage by hand, if electrical power is not available. The pulleys 82 alongside of the sprocket 104 have bearings supported on a pulley housing 116 attached to the motor housing 94. Consequently, the radial loading on the output shaft 105 is reduced because only the tension of the chain 106, and not the tension of the rear cables 115, is applied to the output shaft 105. The load on the internal shafts and bearings of the extension motor 102 and the gear drive 96 are reduced, which reduces wear and noise. The tension load on the chain 106 is also reduced as the tension in the rear cables 115 offsets a majority of the tension in the front cables 110.

In use, the crane arm 22 is mounted on a camera dolly or pedestal. In designs having a two meter telescoping movement, the crane arm 22 is light enough to be lifted by a camera crew. The crane arm 22 can therefore be mounted on a camera dolly without lifting equipment. The crane arm 22 is typically first locked into a horizontal position, either via the tilt brake or via a strut temporarily attached to the base frame 30 and to the crane arm 22. A camera is attached to the mounting plate and the crane arm 22 is balanced as described above. The crane arm 22 is positioned as desired via a crane operator grasping the handles and pushing or pulling the crane arm. The inner arm is telescopically extended using a wired or wireless control which controls the extension motor 102. When the motor is actuated to extend, the extension motor 102 turns the sprocket 104 counterclockwise in FIG. 8. The chain 106 pulls the counterweight carriage 34 towards the rear of the crane arm 22. Simultaneously, the front cables 110 pull the inner arm forward, extending the inner arm. The extension motor 102 and gear drive 96 may be selected so that they can be readily back-driven, by pushing or pulling on inner arm 58 with a nominal force of e.g., 90 to 225 N. This allows the inner arm 58 to be manually telescopically moved in or out, without using the motor.

The arm is retracted by operating the extension motor 102 in the reverse direction, with the chain 106 pulling the inner arm back into the outer arm, and with the front cables pulling the counterweight carriage towards the front of the crane arm 22. One or more shock absorbers may be provided on the counterweight carriage or at front and rear stop positions on the outer arm 56, to prevent the counterweight carriage from making a hard impact at the front or rear limit of travel. The electronic controller of the extension motor 102 may also be linked to sensors which detect the position of the counterweight carriage, to decelerate the counterweight carriage automatically as it approaches the front or rear limit of travel. In the example shown with an outer arm 56 about length of about 300 cm, the inner arm travel is about 215 cm.

The example shown in the drawings having 2 meters of extension weighs about 170 kg. Typical crane weights using the design shown are 120 kg to 200 kg. The same design principals may of course be used to provide even lighter designs, having less extension. Since the crane arm 22 has only a single moving arm, the weight and complexity of additional rollers, cables and other components associated with having two or more moving arms, is avoided. The crane arm 22 also provides a more simple design which may be manufactured with fewer components and steps, and which may be provided at lower cost compared to existing designs. As described above, the inner arm 58 is supported within the outer arm only by the front rollers 86 and the rear rollers 72 and 74, with no intermediate rollers used.

Thus, a novel telescoping camera crane has been shown and described. Various changes and substitutions may of course be made without departing from the spirit and scope of the invention. The invention, therefore, should not be limited, except to the following claims, and their equivalents.

The invention claimed is:

1. A camera crane, comprising:
   a base;
   an outer arm pivotally attached to the base;
   a trim weight tray rigidly attached to a back end of the outer arm;
   a counterweight carriage supported on the outer arm, on carriage rollers;
   an inner arm telescopically supported within the outer arm on arm rollers;
   an electric extension motor on the outer arm;
   a first tension element engaged with the electric extension motor and having a first end attached to the counterweight carriage, and a second end attached to the inner arm;
   a second tension element having a first end attached to the counterweight carriage and a second end attached to the inner arm;
   a nose frame rigidly attached to a front end of the inner arm;
   a mounting plate pivotally attached to the nose frame; and
   an electric leveling motor on the nose frame linked to the mounting plate;
   with the base having a left base plate on a left side of the outer arm and a right base plate on a right side of the outer arm, with the outer arm pivotally attached to the base via left and right axles on the left and right base plates;
   a left tilt brake assembly on the left base plate having an upper left tilt brake sprocket co-axial with the left axle stub, a lower left tilt brake sprocket spaced apart from the upper left tilt brake sprocket, a left tilt brake chain connecting the upper and lower left tilt brake sprockets, and a left tilt brake lever rigidly attached to the lower left tilt brake sprocket, with movement of the left tilt brake lever braking pivoting movement of the outer arm on the base.

2. The camera crane of claim 1 with the upper left tilt brake sprocket rigidly connected to a brake plate for exerting braking force between the base and the outer arm.

3. The camera crane of claim 1 further including a right tilt brake assembly on the right base plate having an upper right tilt brake sprocket co-axial with the right axle stub, a lower right tilt brake sprocket spaced apart from the upper right tilt brake sprocket, a right tilt brake chain connecting the upper and lower right tilt brake sprockets, a right tilt brake lever rigidly attached to the lower right tilt brake sprocket, and a tilt brake axle rigidly connected to the lower left tilt brake sprocket and to the lower right tilt brake sprocket.

4. The camera crane of claim 3 with the counterweight carriage having top weights and side weights, with the side weights having a lower end extending below a bottom surface of the outer arm, and with the tilt brake axle below the lower ends of the side weights.

5. The camera crane of claim 1 with the left and right base plates attached to left and right sides of a base frame rotatably mounted on a center post of the base, further including a pan brake including a split collar around the center post, a pan brake rod linked to the split collar passing through at least one of the left and right base plates, and a pan brake lever on an end of the pan brake rod.

6. The camera crane of claim 1 including upper and lower roller tracks on opposites sides of the inner arm supported on left and right front rollers at a front end of the outer arm.

7. The camera crane of claim 6 wherein inner arm is telescopically supported in the outer arm only by the front rollers and upper and lower inner rollers on a back end of the inner arm.

8. The camera crane of claim 7 further including four upper inner rollers and two lower inner rollers at a back end of the inner arm for rolling on upper and lower inner surfaces of the outer arm.

9. The camera crane of claim 1 wherein the first tension element comprises a chain passing around a sprocket on the extension motor, and the second tension element comprises one or more cables passing over pulleys at a front end of the outer arm.

10. The camera crane of claim 1 further including a monitor support attached to the left base plate.

11. The camera crane of claim 1 with the first and second tension elements positioned in the upper and lower central channels of the outer arm.

12. A camera crane, comprising:
a base pivotally attached onto a base plate adapted for mounting on a camera dolly;
an outer arm pivotally attached to the base;
a trim weight tray rigidly attached to a back end of the outer arm;
one or more pulleys at a front end of the outer arm;
a counterweight carriage supported on carriage rollers, on the outer arm;
an inner arm telescopically supported on arm rollers within the outer arm;
an electric extension motor on the outer arm;
a chain extending around a sprocket on the electric extension motor, with the chain having a first end attached to the counterweight carriage, and a second end attached to the inner arm;
one or more cables extending around the pulleys and having a first end attached to the counterweight carriage and a second end attached to the inner arm, with a length of the chain and the cable positioned within a channel in the outer arm;
a nose frame rigidly attached to a front end of the inner arm;
a mounting plate pivotally attached to the nose frame;
an electric leveling motor on the nose frame linked to the mounting plate;
first and second upright base plates on the base, on opposite sides of the outer arm;
a first tilt brake sprocket pivotally attached to the first upright base plate and co-axial with a tilt axis of the outer arm;
a second tilt brake sprocket pivotally attached to the first upright base plate and spaced apart from, and below, the first tilt brake sprocket;
a tilt brake chain connecting the first and second tilt brake sprockets;
a tilt brake lever rigidly attached to the second tilt brake sprocket, with movement of the tilt brake lever actuating a tilt brake to brake pivoting movement of the outer arm on the base; and
at least one monitor support attached to the first upright base plate.

13. The camera crane of claim 12 having a weight of 120 to 200 kg.

14. A camera crane, comprising:
a base;
an outer arm pivotally attached to the base;
a trim weight tray rigidly attached to a back end of the outer arm;
a counterweight carriage supported on the outer arm, on carriage rollers;
a single inner arm telescopically supported within the outer arm only via front rollers at the front end of the outer arm and by rear rollers at the rear end of the inner arm;
an electric extension motor on the outer arm;
a first tension element engaged with the electric extension motor and having a first end attached to the counterweight carriage, and a second end attached to the inner arm;
a second tension element having a first end attached to the counterweight carriage and a second end attached to the inner arm;
a nose frame rigidly attached to a front end of the inner arm;
a mounting plate pivotally attached to the nose frame;
an electric leveling motor on the nose frame linked to the mounting plate; and
with the first tension element comprising a chain, and with the electric extension motor having a motor shaft driving a gear reduction unit having sprocket engaged with the chain, and with the electric extension motor and the gear reduction unit having a gear reduction ratio of 2 to 6 to allow the inner arm to be manually back-driven.

15. A camera crane, comprising:
a base;
an outer arm pivotally attached to the base;
a trim weight tray rigidly attached to a back end of the outer arm;
a counterweight carriage supported on the outer arm, on carriage rollers;
a single inner arm telescopically supported within the outer arm only via front rollers at a front end of the outer arm and by rear rollers at a rear end of the inner arm;
an electric extension motor on the outer arm;
a first tension element engaged with the electric extension motor and having a first end attached to the counterweight carriage, and a second end attached to the inner arm;
a second tension element having a first end attached to the counterweight carriage and a second end attached to the inner arm;
a nose frame rigidly attached to a front end of the inner arm;
a mounting plate pivotally attached to the nose frame;
an electric leveling motor on the nose frame linked to the mounting plate;
the electric extension motor including an output shaft and a motor enclosure;
a sprocket attached onto the output shaft with the first tension element engaged with the electric extension motor via the first tension element engaged around the sprocket;
the output shaft extending through a pulley supported on a bearing attached to the motor enclosure; and
a cable extending around the pulley, with the cable having a first end attached to the counterweight carriage and a second end attached to the rear end of the inner arm.

* * * * *